(12) United States Patent
Gresset et al.

(10) Patent No.: US 8,737,379 B2
(45) Date of Patent: May 27, 2014

(54) METHODS AND DEVICES FOR PERFORMING SYNCHRONIZATION AND COMPENSATING CLOCK DRIFT AMONG COMMUNICATION DEVICES

(75) Inventors: Nicolas Gresset, Rennes Cedex (FR); Jonathan Letessier, Rennes (FR)

(73) Assignee: Mitsubishi Electric Corporation, Tokyo (JP)

( * ) Notice: Subject to any disclaimer, the term of this patent is extended or adjusted under 35 U.S.C. 154(b) by 107 days.

(21) Appl. No.: 13/541,295

(22) Filed: Jul. 3, 2012

(65) Prior Publication Data
US 2013/0010781 A1    Jan. 10, 2013

(30) Foreign Application Priority Data
Jul. 4, 2011    (EP) .................................... 11172491

(51) Int. Cl.
*H04J 3/06*    (2006.01)
(52) U.S. Cl.
USPC .......................................... 370/350; 370/516
(58) Field of Classification Search
USPC .......... 370/350, 503, 509, 510, 512, 516–520
See application file for complete search history.

(56) References Cited

U.S. PATENT DOCUMENTS

| | | | |
|---|---|---|---|
| 7,668,151 B2 * | 2/2010 | Ryu et al. ...................... | 370/350 |
| 2004/0005902 A1 | 1/2004 | Belcea | |
| 2007/0081514 A1 * | 4/2007 | Shirokura et al. ............ | 370/350 |
| 2008/0152059 A1 | 6/2008 | Suemitsu et al. | |
| 2008/0273521 A1 * | 11/2008 | Shao et al. ..................... | 370/350 |
| 2009/0154343 A1 * | 6/2009 | Fitch et al. ..................... | 370/221 |
| 2010/0098204 A1 | 4/2010 | Ratiu et al. | |
| 2011/0150005 A1 * | 6/2011 | Chen et al. ..................... | 370/503 |

FOREIGN PATENT DOCUMENTS

| | | | |
|---|---|---|---|
| EP | 1 845 740 A1 | 10/2007 | |
| WO | WO 2010/014875 A1 | 2/2010 | |

OTHER PUBLICATIONS

Partial European Search Report issued on Jan. 17, 2012 in corresponding European Application No. 11172491.0 filed on Jul. 4, 2011.
Extended European Search Report issued on Jun. 20, 2012 in corresponding European Application No. 11172491.0 filed on Jul. 4, 2011.
Luca Schenato et al., "A distributed consensus protocol for clock synchronization in wireless sensor network", Proceedings of the 46$^{th}$ IEEE Conference on Decision and Control, New Orleans, LA, USA, Dec. 12-14, 2007, XP 031205368, pp. 2289-2294.

* cited by examiner

*Primary Examiner* — Hong Cho
(74) *Attorney, Agent, or Firm* — Oblon, Spivak, McClelland, Maier & Neustadt, L.L.P.

(57) ABSTRACT

In order to perform synchronization and compensate clock drift among a plurality of communication devices interconnected to form a mesh communications network, all communication devices, except one given communication device, perform a first distributed consensus-based synchronization. The given communication device performs: obtaining a first correction information derived at least from a difference between a clock timing resulting from the first distributed consensus-based synchronization and a reference clock timing; and transmitting the first correction information through the mesh communications network. All the communication devices, except said given communication device, further perform updating the clock timing resulting from the first distributed consensus-based synchronization by taking into account the transmitted first correction information.

14 Claims, 8 Drawing Sheets

Figure 1:
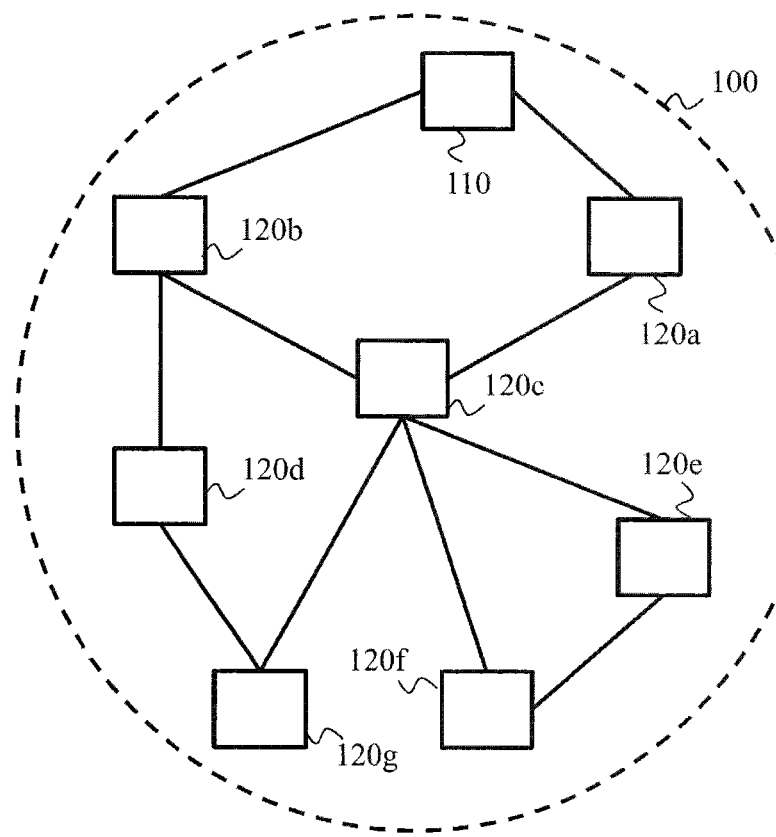

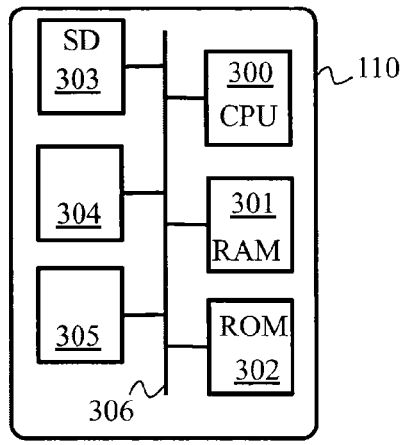
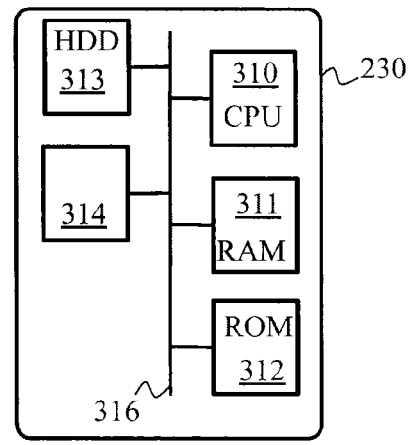
Fig. 3a               Fig. 3b
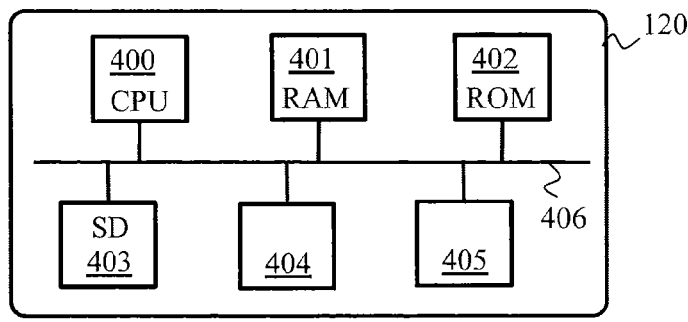
Fig. 4
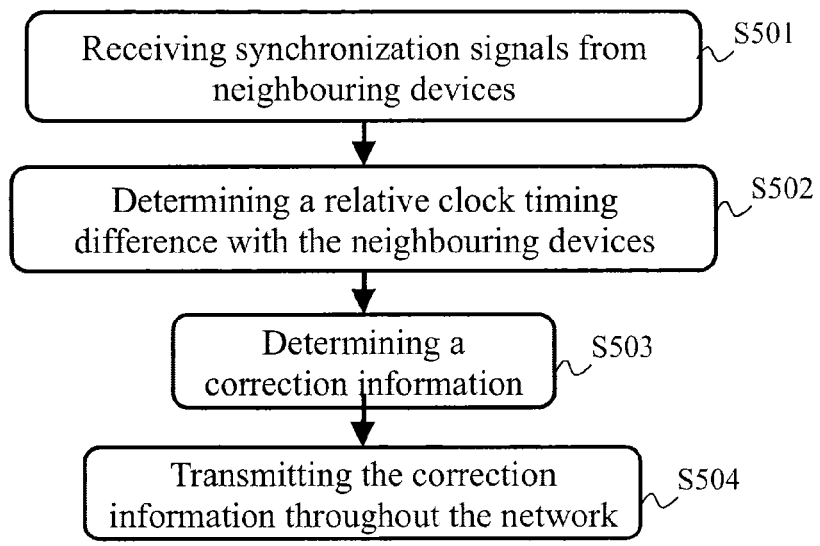
Fig. 5

METHODS AND DEVICES FOR PERFORMING SYNCHRONIZATION AND COMPENSATING CLOCK DRIFT AMONG COMMUNICATION DEVICES

The present invention generally relates to synchronization and clock drift correction between communication devices of a mesh-based communications network.

Wireless Sensor Networks (WSNs) have gained interest and popularity for being self-configuring, rather inexpensive, and useful for a very wide range of possible applications, such as energy control, environmental monitoring, industrial automation . . . .

Smart Meter Networks (SMNs) is an application example of such Wireless Sensor Networks. A smart meter is usually an electrical meter that records consumption of electric energy in intervals of a given period and communicates that information to a server for monitoring and billing purposes. Smart meters are usually able to receive commands from a central system. Smart meters are also used in other data capturing domains and can for instance also mean devices measuring natural gas or water consumption.

In such communications networks, it is desirable that the communication devices act in a synchronized fashion. In particular, it is desirable to set up global clock synchronization, i.e. all the communication devices refer to a common time reference. It means, as the propagation time periods between communication devices and as the oscillators of the communication devices are not strictly equivalent, that a clock drift appears from one communication device to another. This clock drift needs to be corrected or compensated. Furthermore, the absolute clock timing must also be as aligned as possible between two communication devices.

Global clock synchronization is rendered complex in Wireless Sensor Networks and consequently in Smart Meter Networks, because of the mesh structure of these networks. Indeed, such communications networks are typically formed in ad hoc fashion. Therefore, all the communication devices cannot directly communicate with each other or with a master communication device, and multi-hop communications have to be set up.

It is possible to perform a global clock synchronization by using the multi-hop characteristic of such wireless mesh communications networks. One master communication device is defined as the global clock reference, then a spanning tree rooted at that master communication device is built. Each node synchronizes itself with its parent node in the defined spanning tree and compensates the clock drift detected with its parent node. This approach however suffers from a major drawback. Indeed, when the wireless mesh communications network has numerous communication devices or when the geographical distance between communication devices is in the order of hundreds of meters or even kilometers, the propagation time of synchronization information is significantly high. This is particularly damageable for TDMA (Time Division Multiple Access) scheduling, as it requires increasing the length of the intercommunications gaps with the increasing of the number of hops and/or with the increasing of the distance between communication devices. This significantly reduces the overall wireless mesh communications network useful bandwidth in order to avoid communications interferences.

In order to avoid this propagation time issue, a distributed consensus-based synchronization approach may be used, which is also more robust to network topology changes. According to this approach, all the devices of the wireless mesh communications network participate in the determination of the reference clock timing. Each communication device shows its own view of the clock timing by transmitting synchronization signals at predefined instants. As the views of the clock timing differ from one communication device to another due to the misalignment of the clock timing resulting from non-negligible propagation time periods and differences in the oscillators performance, the transmissions are effectively performed at different instants. Each communication device measures the relative time differences between its own clock timings and the observations of the clock timings shown by the other communication devices, and adjusts accordingly its own clock timing. The communication devices therefore converge toward a substantially identical clock timing. However, the clock timing toward which the communication devices converge may suffer from clock drift, which may result in a transmission frequency shift. In addition, such a drift of distributed consensus-based synchronization may produce interferences between clusters of communication devices, when each cluster applies its own distributed consensus-based synchronization but wherein all clusters share a same transmission resource, i.e. time in TDMA type of accesses or frequency in FDMA (Frequency Division Multiple Access) type of accesses.

The aforementioned misalignment and clock drift issues may also occur in mesh communications network of other kind, such as long-distance mesh optical networks or long-distance mesh wired networks.

It is desirable to overcome the aforementioned problems, which occur in mesh communications networks, and more particularly in clusters of smart meters.

In particular, it is desirable to provide a solution that allows compensating clock drift in mesh communications networks while providing a fine global synchronization.

It is furthermore desirable to provide a solution that allows compensating clock drift in mesh communications networks forming clusters sharing a same transmission resource while providing a fine global synchronization.

To that end, the present invention concerns a method for performing synchronization and compensating clock drift among a plurality of communication devices interconnected to form a mesh communications network. The method is such that all said communication devices, except one given communication device, perform a first distributed consensus-based synchronization. The method is further such that said given communication device performs: obtaining a first correction information derived at least from a difference between a clock timing resulting from the first distributed consensus-based synchronization and a reference clock timing; transmitting the first correction information through the mesh communications network. The method is furthermore such that all said communication devices, except said given communication device, further perform: updating the clock timing resulting from the first distributed consensus-based synchronization by taking into account the transmitted first correction information.

Thus, all the communication devices, except one, which is the so-called given communication device, perform the distributed consensus-based synchronization. The given communication device is not involved in the distributed consensus-based synchronization but observes its course. In order to perform fine global synchronization and compensate clock drift between the clock timing resulting from the distributed consensus-based synchronization as observed by said given communication device and the reference clock, said given communication device obtains a correction information, so-called first correction information, and broadcasts this correction information throughout the mesh communications network. Thanks to its observation of the course of the distributed consensus-based synchronization, it allows adjusting the clock timing resulting from the distributed consensus-based synchronization on the basis of the correction information, which further allows aligning the clock timing of all communication devices. This allows ensuring the alignment of the clock timings to the reference clock.

According to a particular feature, said given communication device obtains the first correction information from at least one clock timing derived from synchronization signals received from at least one respective communication device when performing the first distributed consensus-based synchronization.

Thus, the clock drift is compensated and the communication devices' clock timings are aligned only on the basis of the distributed consensus-based synchronization performed in the mesh communications network.

According to a particular feature, said given communication device obtains the first correction information from a server device and in that said given communication device performs: obtaining a local correction information from one clock timing derived from synchronization signals received from at least one respective communication device when performing the distributed consensus-based synchronization; transmitting the local correction information to the server device. The method is such that, the server device being connected to multiple groups of communication devices interconnected to form respective mesh communications networks, said server device performs: receiving a local correction information from one communication device of each said group; combining the received local correction information to obtain said first correction information.

Thus, thanks to the use of said server device, the communication devices are synchronized as if they would belong to a single cluster and no inter-cluster de-synchronization exists anymore.

According to a particular feature, said given communication device being interconnected with at least one group of communication devices interconnected to form at least one other respective mesh communications network, said given communication device performs: obtaining a local correction information from one clock timing derived from synchronization signals received from at least one respective communication device when performing the first distributed consensus-based synchronization and the reference clock; transmitting the local correction information to one communication device of each said another group; receiving another local correction information from said communication device of each said another group; combining the received local correction information to obtain said first correction information.

Thus, thanks to a collaboration of one communication device in each mesh communications network, communication devices are synchronized as if they would belong to a single cluster and no inter-cluster de-synchronization exists anymore, without requiring the use of a server node.

According to a particular feature, said given communication device being interconnected with plural groups of communication devices interconnected to form plural respective other mesh communications networks, a set of communication devices performs a second distributed consensus-based synchronization, said set being formed by one communication device for each said other mesh communications network. The method is such that said given communication device performs: obtaining a second correction information derived at least from a difference between a clock timing resulting from the second distributed consensus-based synchronization and the reference clock timing; transmitting the second correction information to said set of communication devices. The method is further such that said set of communication devices further performs: updating the clock timing resulting from the second distributed consensus-based synchronization by taking into account the transmitted second correction information.

Thus, a two-stage distributed consensus-based algorithm is set up. Such a method thus allows converging toward a reference clock timing, defined by said given communication device. It avoids implementing a synchronized reference clock available at each mesh communications network, such as for instance a synchronized reference clock based on GPS (Global Positioning System) signalling.

According to a particular feature, said given communication device obtains the first correction information from at least one clock timing derived from synchronization signals received from at least one respective communication device when performing the first distributed consensus-based synchronization and from at least one other clock timing derived from other synchronization signals received from said at least one respective communication device when performing another distributed consensus-based synchronization.

Thus, even though the given communication device doesn't share the reference clock timing with devices of another mesh communications network, as the given communication device can observe the clock timing resulting from said another distributed consensus-based synchronization, it can make all distributed consensus-based synchronization converge toward a same reference clock timing.

According to a particular feature, said given communication device adjusts the reference clock timing from the at least one clock timing derived from synchronization signals received from said at least one respective communication device when performing the first distributed consensus-based synchronization and from the at least one other clock timing derived from other synchronization signals received from said at least one respective communication device when performing said another distributed consensus-based synchronization.

Thus, the reference clock timing converges toward a clock timing used by other devices performing said another distributed consensus-based synchronization.

The present invention also concerns a system for performing synchronization and compensating clock drift among a plurality of communication devices interconnected to form a mesh communications network. The system is such that all said communication devices, except one given communication device, comprise means for performing a first distributed consensus-based synchronization. The system is further such that said given communication device comprises: means for obtaining a first correction information derived at least from a difference between a clock timing resulting from the first distributed consensus-based synchronization and a reference clock timing; means for transmitting the first correction information through the mesh communications network. The system is furthermore such that all said communication devices, except said given communication device, further comprise means for updating the clock timing resulting from the first distributed consensus-based synchronization by taking into account the transmitted first correction information.

The present invention also concerns a method for performing synchronization and compensating clock drift among a plurality of communication devices interconnected to form a mesh communications network. The method is such that a given communication device performs: obtaining a first correction information derived at least from a difference between a clock timing resulting from a first distributed consensus-based synchronization and a reference clock timing, the first distributed consensus-based synchronization being performed by all said communication devices, except said given communication device; transmitting the first correction information through the mesh communications network, the transmitted first correction information aiming all said communication devices, except said given communication device, at updating the clock timing resulting from the first distributed consensus-based synchronization.

The present invention also concerns a communication device for performing synchronization and compensating clock drift among a plurality of communication devices interconnected to form a mesh communications network. The considered communication device is such that it comprises: means for obtaining a first correction information derived at least from a difference between a clock timing resulting from a first distributed consensus-based synchronization and a reference clock timing, the first distributed consensus-based synchronization being performed by all said communication devices, except the claimed communication device; means for transmitting the first correction information through the mesh communications network, the transmitted first correction information aiming all said communication devices, except said given communication device, at updating the clock timing resulting from the first distributed consensus-based synchronization.

The present invention also concerns a method for performing synchronization and compensating clock drift, the method being performed by a server device connected to multiple groups of communication devices interconnected to form respective mesh communications networks. The method is such that said server device performs: receiving a local correction information from one communication device of each said group, said local correction information being obtained from one clock timing derived from synchronization signals received from at least one respective communication device when performing a first distributed consensus-based synchronization and the reference clock; combining the received local correction information to obtain a first correction information; transmitting the first correction information to said one communication device of each said group, the transmitted first correction information aiming said one communication device of each said group at allowing updating the clock timing resulting from the first distributed consensus-based synchronization.

The present invention also concerns a server device for performing synchronization and compensating clock drift, the server device aiming at being connected to multiple groups of communication devices interconnected to form respective mesh communications networks. The server device is such that it comprises: means for receiving a local correction information from one communication device of each said group, said local correction information being obtained from one clock timing derived from synchronization signals received from at least one respective communication device when performing a first distributed consensus-based synchronization and the reference clock; means for combining the received local correction information to obtain a first correction information; means for transmitting the first correction information to said one communication device of each said group, the transmitted first correction information aiming said one communication device of each said group at allowing updating the clock timing resulting from the first distributed consensus-based synchronization.

The present invention also concerns a method for performing synchronization and compensating clock drift among a plurality of communication devices interconnected to form a mesh communications network. The method is such that a considered communication device performs, in collaboration with all said communication devices except one given communication device, a first distributed consensus-based synchronization; receiving a first correction from said given communication device, said first correction information being derived at least from a difference between a clock timing resulting from the first distributed consensus-based synchronization and a reference clock timing; updating the clock timing resulting from the first distributed consensus-based synchronization by taking into account the received first correction information.

The present invention also concerns a communication device for performing synchronization and compensating clock drift among a plurality of communication devices interconnected to form a mesh communications network. The considered communication device is such that it comprises: means for performing, in collaboration with all said communication devices except one given communication device, a first distributed consensus-based synchronization; means for receiving a first correction from said given communication device, said first correction information being derived at least from a difference between a clock timing resulting from the first distributed consensus-based synchronization and a reference clock timing; means for updating the clock timing resulting from the first distributed consensus-based synchronization by taking into account the received first correction information.

The present invention also concerns, in at least one embodiment, a computer program that can be downloaded from a communications network and/or stored on a medium that can be read by a computer and run by a processor. This computer program comprises instructions for implementing the aforementioned methods, when said program is run by the processor.

The present invention also concerns an information storage means, storing a computer program comprising a set of instructions that can be run by a processor for implementing the aforementioned methods, when the stored information is read by a computer and run by a processor.

Since the features and advantages related to the devices, to the system and to the computer program are identical to those already mentioned with regard to the corresponding aforementioned methods, they are not repeated here.

Figure 2:
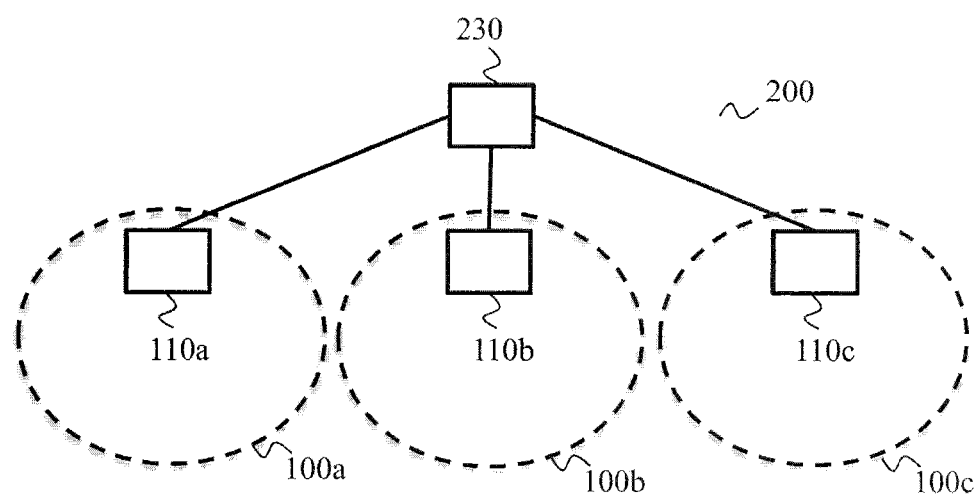
Figure 6:
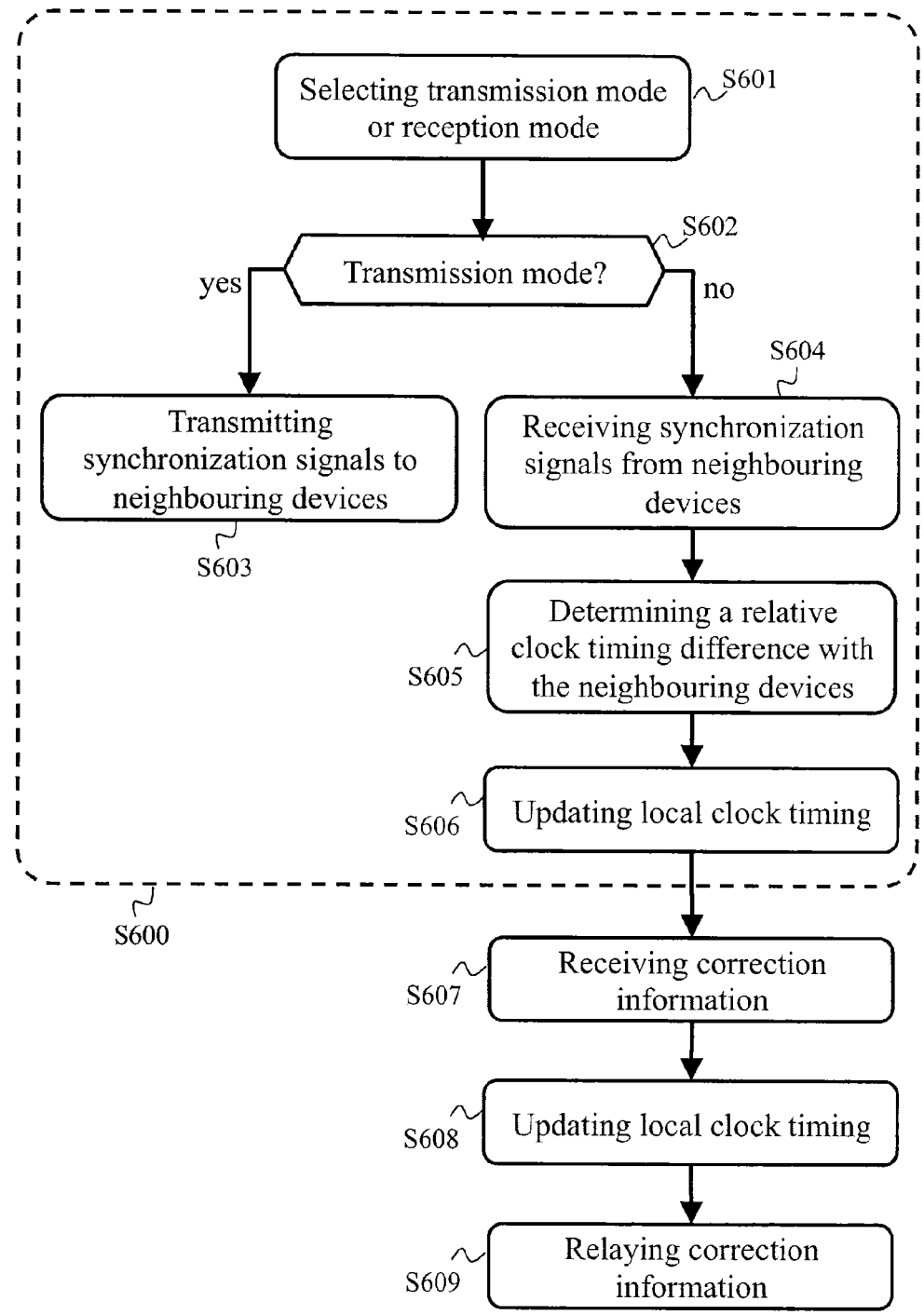
Figure 7:
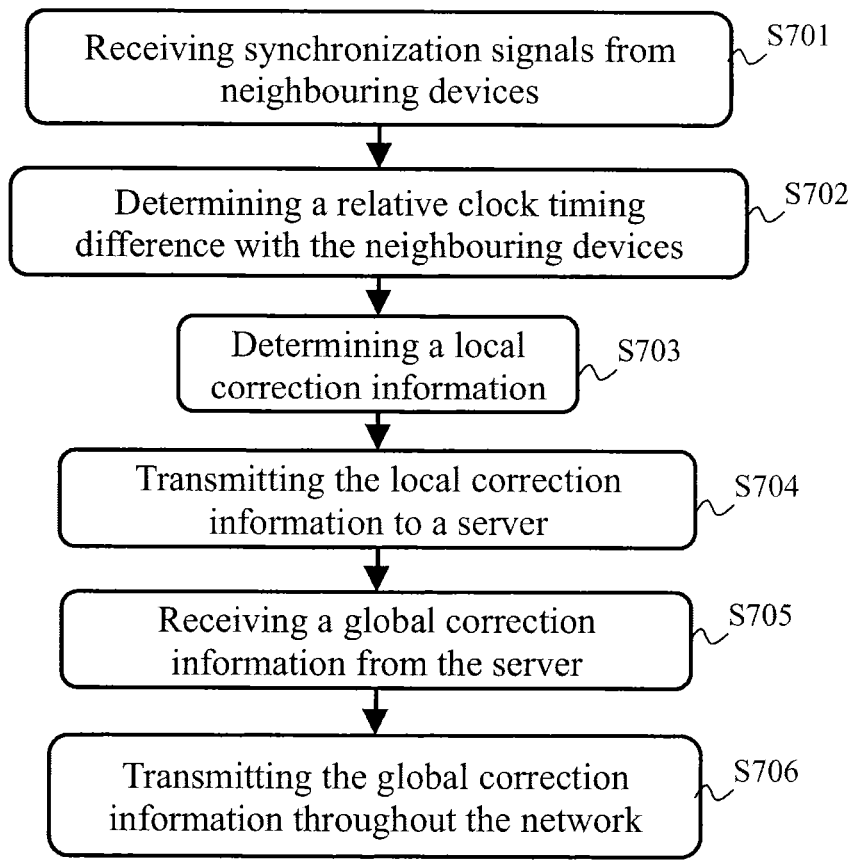
Figure 8:
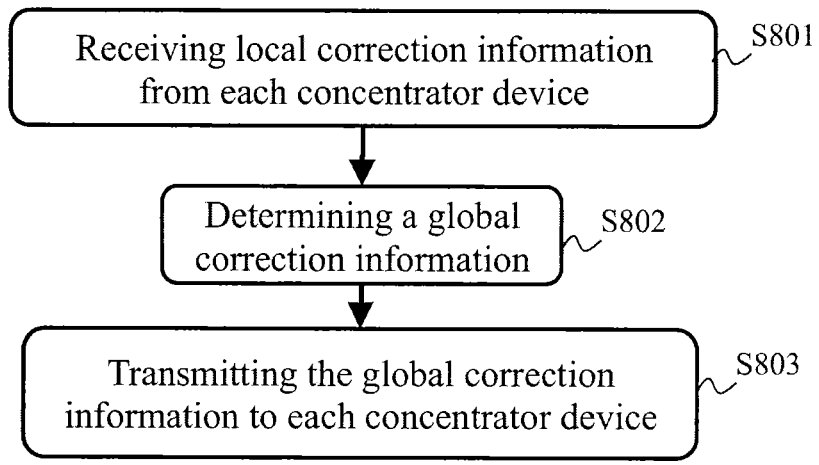
Figure 9:
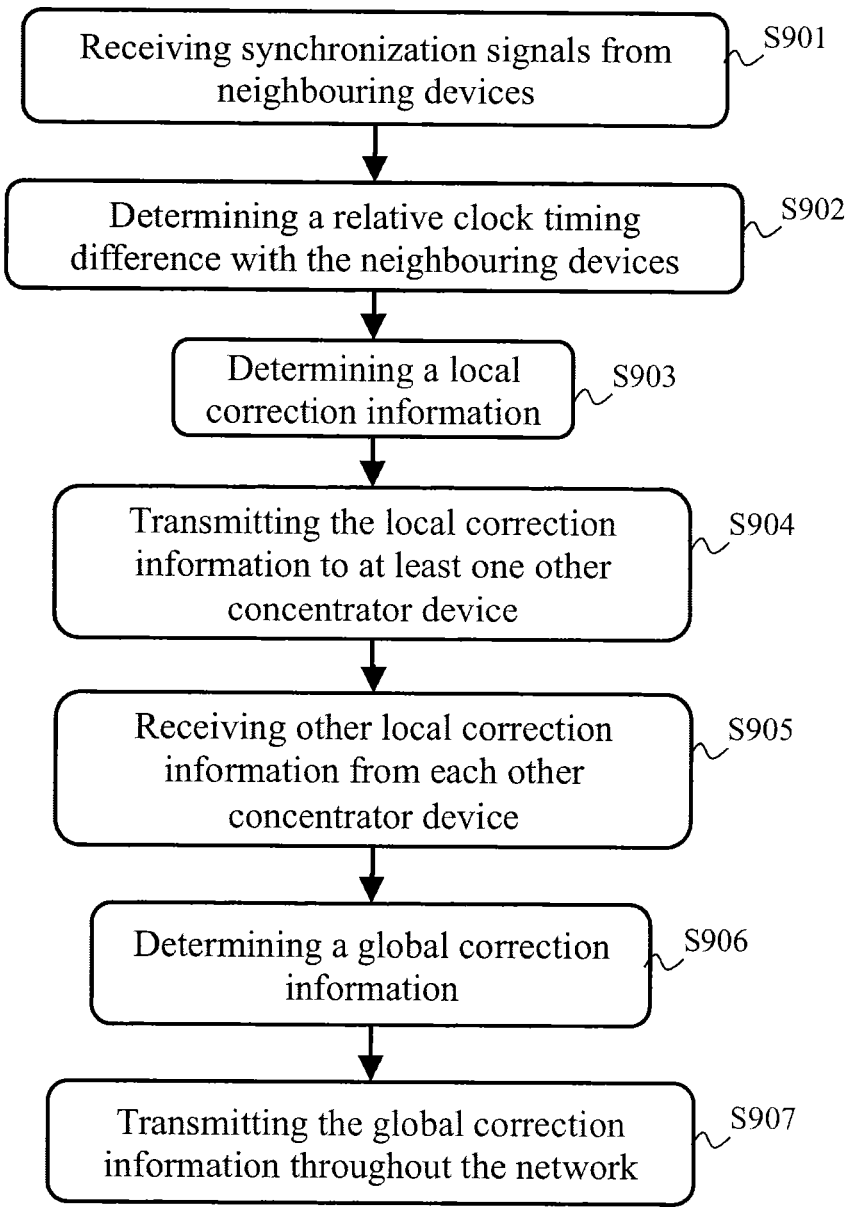
Figure 10:
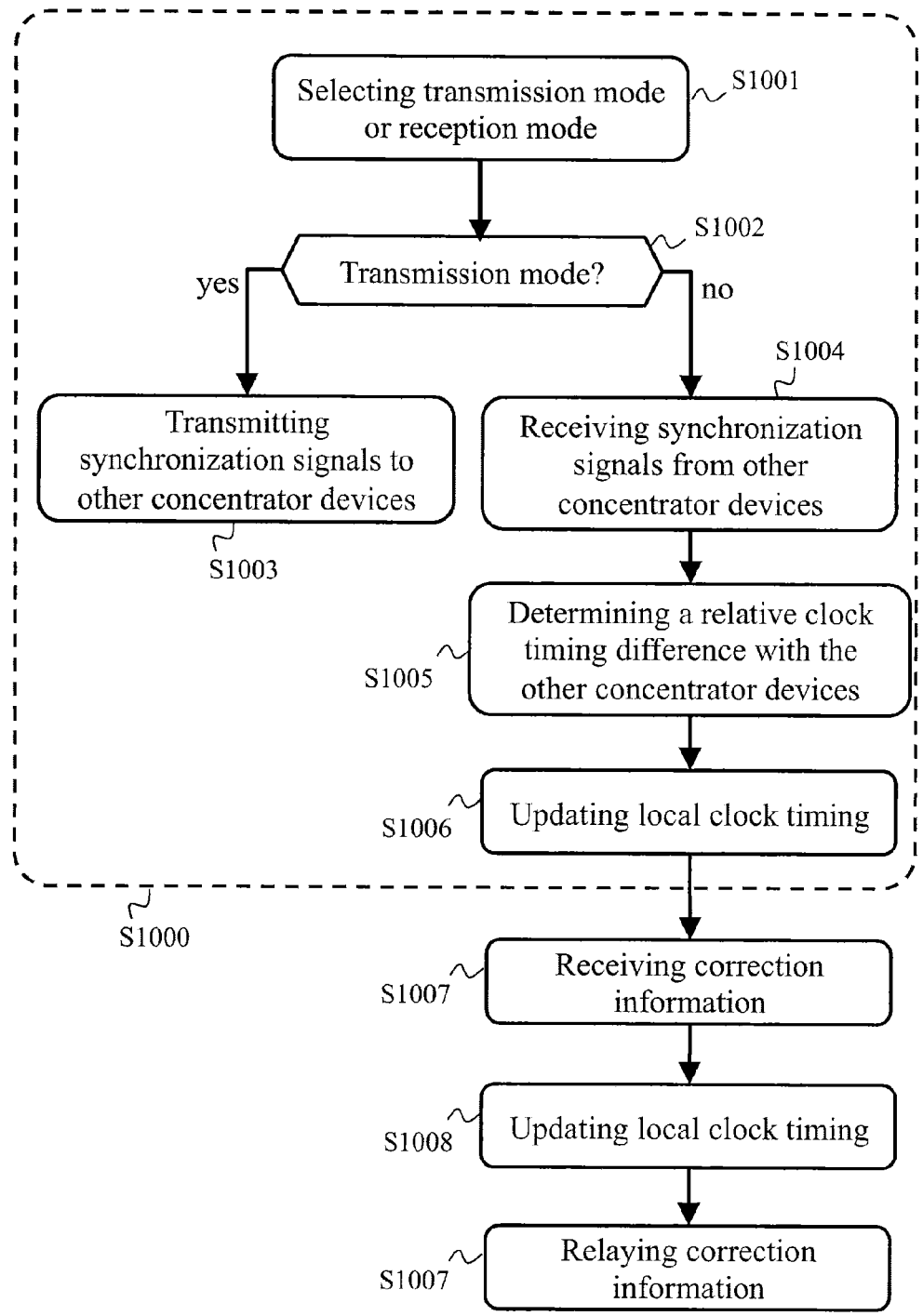
Figure 11:
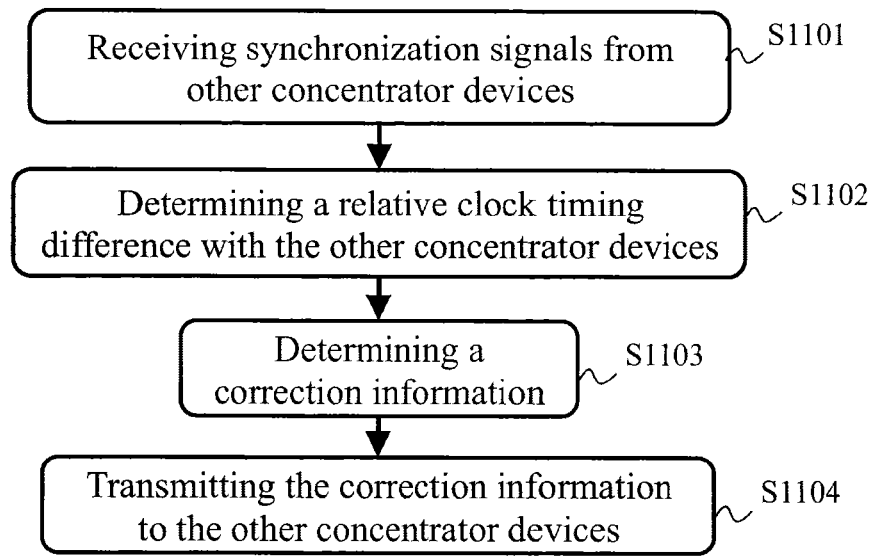
Figure 12:
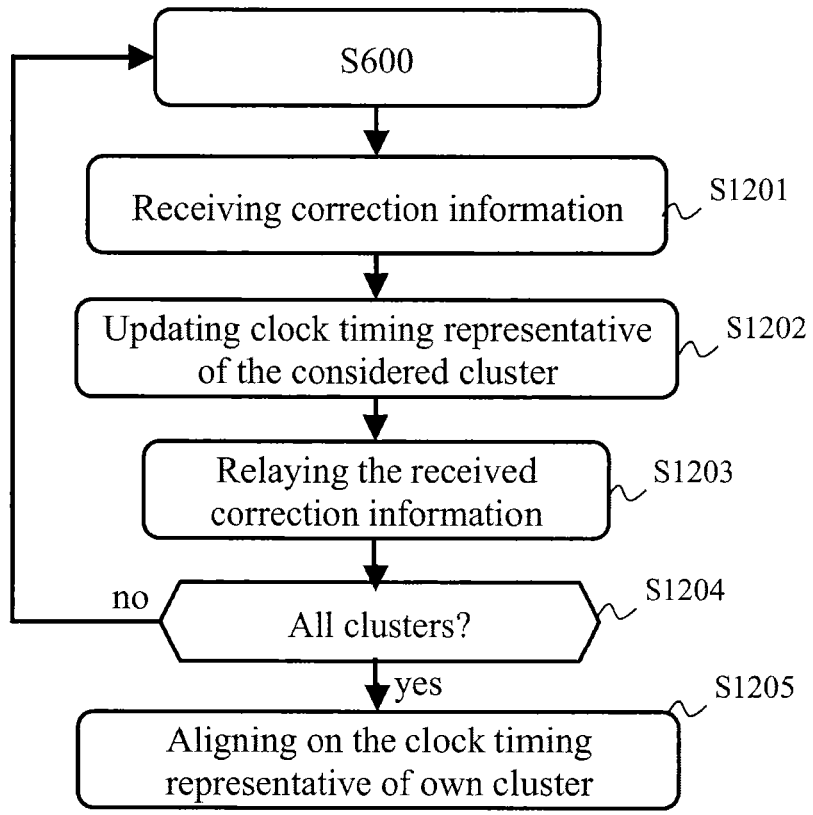
Figure 13:
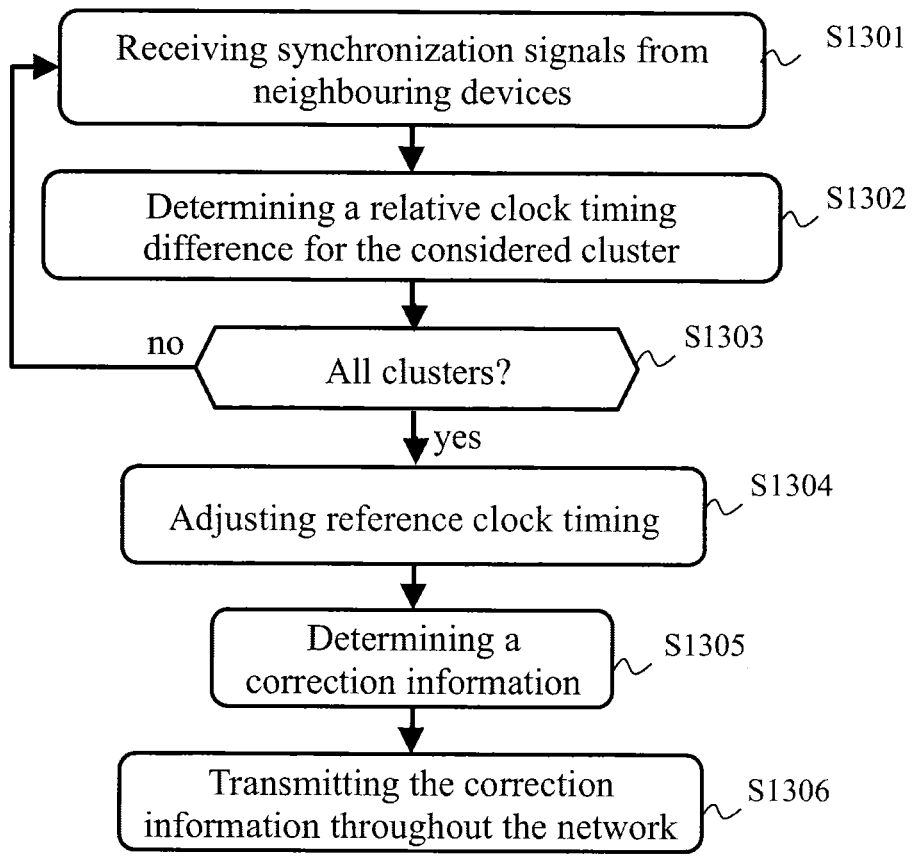

The characteristics of the invention will emerge more clearly from a reading of the following description of an example of embodiment, said description being produced with reference to the accompanying drawings, among which:

FIG. 1 schematically represents a first architecture of a communications network in which the present invention may be implemented;

FIG. 2 schematically represents a second architecture of a communications network in which the present invention may be implemented;

FIG. 3a schematically represents an architecture of a concentrator device of the communications network of FIG. 1 or 2;

FIG. 3b schematically represents an architecture of a server device of the communications network of FIG. 2;

FIG. 4 schematically represents an architecture of a smart meter of the communications network of FIG. 1 or 2;

FIG. 5 schematically represents an algorithm for performing synchronization and clock drift compensation, performed by a concentrator device of the communications network of FIG. 1 or 2;

FIG. 6 schematically represents an algorithm for performing synchronization and clock drift compensation, performed by a smart meter of the communications network of FIG. 1 or 2;

FIG. 7 schematically represents an algorithm for performing synchronization and clock drift compensation, performed by a concentrator device of the communications network of FIG. 2;

FIG. 8 schematically represents an algorithm for performing synchronization and clock drift compensation, performed by a server device of the communications network of FIG. 2;

FIG. 9 schematically represents another algorithm for performing synchronization and clock drift compensation, performed by a concentrator device of the communications network of FIG. 2;

FIG. 10 schematically represents yet another algorithm for performing synchronization and clock drift compensation, performed by a concentrator device of the communications network of FIG. 2;

FIG. 11 schematically represents yet another algorithm for performing synchronization and clock drift compensation, performed by a concentrator device of the communications network of FIG. 2;

FIG. 12 schematically represents another algorithm for performing synchronization and clock drift compensation, performed by a smart meter of the communications network of FIG. 2;

FIG. 13 schematically represents yet another algorithm for performing synchronization and clock drift compensation, performed by a concentrator device of the communications network of FIG. 2.

Even though the following description details the present invention in the scope of the deployment of wireless mesh communications networks of smart meters, the principles detailed hereinafter may be similarly applied in the deployment of other kinds of wireless mesh communications networks. For instance, the principles detailed hereinafter may be similarly applied in the deployment of femtocells, i.e. the deployment of cellular base stations typically designed for use in a home or small office allowing service providers to extend service coverage indoors, especially where access would otherwise be limited or unavailable. In that case, the cellular base stations are adapted to wirelessly communicate with each other in order to perform the synchronization.

Moreover, even though the following description details the present invention in the scope of the deployment of wireless mesh communications networks, the principles detailed hereinafter may be similarly applied in the deployment of other kinds of mesh communications networks. For instance, the principles detailed hereinafter may be similarly applied in the deployment of optical mesh communications networks or wired mesh communications networks.

FIG. 1 schematically represents a first architecture of a communications network 100 in which the present invention may be implemented.

The communications network 100 is a mesh communications network comprising a concentrator device 110 and a set of smart meters, also referred to as smart metering devices. Six smart meters 120$i$, wherein i=a, b, . . . , g, are shown in FIG. 1. A different plurality of smart meters may be present in the communications network 100. The communications network 100 is also referred to as cluster.

The devices of the communications network 100 preferably use half-duplex wireless communications. The devices of the communications network 100 may however use full-duplex wireless communications.

Such a wireless mesh communications network is particularly adapted to the deployment of smart meters in ad-hoc fashion.

In order to limit the power consumption and the radiations, the devices in the communications network 100 cannot communicate directly with any other device in the communications network 100. Each device in the communications network 100 is usually able to communicate directly with only few other devices in the communications network 100. It means that, for these few other devices, the transmission signal strength is considered sufficiently high, e.g. above a predetermined threshold, for exchanging synchronization signals, messages and more generally data.

Each device of the mesh communications network 100 is therefore able to communicate directly with at least one other device of the mesh communications network 100.

Two devices of the mesh communications network 100 communicating directly together are neighbouring devices. More generally, neighbouring devices are devices that can exchange synchronization signals in the scope of a distributed consensus-based synchronization, as detailed hereafter.

Any couple of devices of the mesh communications network 100 can communicate together, either directly or indirectly, i.e. via at least one other device of the mesh communications network 100. More particularly, each smart meter 120$i$, wherein i=a, b, . . . , g, can communicate with the concentrator device 110, either directly or indirectly.

In FIG. 1, possible direct communications are illustratively represented by respective straight lines between the concerned devices. For instance: the concentrator device 110 has two neighbouring devices, which are the smart meters 120$a$, 120$b$; the smart meter 120$a$ has two neighbouring devices, which are the smart meter 120$c$ and the concentrator device 110; and the smart meter 120$b$ has three neighbouring devices, which are the smarts meters 120$c$, 120$d$ and the concentrator device 110. FIG. 1 illustratively shows other possible direct communications in the mesh communications network 100, but they are not further detailed herein.

The communications in the mesh communications network 100 are preferably performed using TDMA. The communications in the mesh communications network 100 may also be performed using FDMA or CDMA (Code Division Multiple Access).

The communications in the wireless mesh communications network 100 are scheduled according to transmission cycles. All the devices of the wireless mesh communications network 100 shall ideally share a common reference clock timing. However, due to the non-negligible propagation time periods between the communication devices and as the communication devices have internal oscillators that are not perfectly identical, each communication device has its own clock timing, i.e. its own view of the clock timing defining the transmission cycles.

In addition, even though a distributed consensus-based algorithm is used in a given cluster, interferences may occur with surrounding communication devices. The description hereafter with regard to FIGS. 5 and 6 particularly aims at addressing this issue.

FIG. 2 schematically represents a second architecture of a communications network 200 in which the present invention may be implemented.

The communications network 200 comprises a server device 230 and a set of concentrator devices. Three concentrator devices 110$m$, wherein m=a, b or c, are shown in FIG. 2. A different plurality of concentrator devices may be present in the communications network 200.

Each concentrator device 110m communicates with the server device 230. The communications between the concentrator devices 110m and the server device 230 are preferably performed using the Internet Protocol (IP), as detailed by the RFC 791 specification, and may be either wired or wireless. The concentrator devices 110m may communicate with each other, also preferably using the Internet Protocol.

Each concentrator device 110m is part of a cluster 100m, wherein m=a, b or c, which corresponds to the mesh wireless communications network 100 shown in FIG. 1. The concentrator devices 110m act as gateways between the server device 230 and the smart meters of the respective clusters 100m to which said concentrator devices 110m respectively belong.

In the architecture shown in FIG. 2, each smart meter belongs to only one cluster and communicates with the server device 230 via a single concentrator device 110m.

In the architecture shown in FIG. 2, the clusters 100m, which are of mesh type, are connected to the server device 230 via respective concentrator devices 110m using a star topology network.

The server device 230 collects the data provided by the smart meters via the concentrator devices 110m and processes the collected data, for instance for statistics and/or monitoring and/or billing purposes. The server device 230 may also transmit commands to any smart meter via a concentrator device 110m. Such commands are for instance for requesting a report from the smart meter, for instructing a shutdown of a system monitored by the smart meter, for providing a software update to the smart meter . . . .

In the architecture shown in FIG. 2, it can be noted that at least one smart meter in a given cluster may receive synchronization signals from at least one other smart meter in another cluster. In this case, the considered smart meters are considered as neighbouring devices, even though they do not belong to the same cluster. A smart meter may therefore take into account, in its implementation of the distributed consensus-based synchronization, the synchronization signals received from a smart meter belonging to a different cluster, as if a smart meter belonging to the same cluster received them.

As already mentioned with regard to FIG. 1, considering that the propagation time periods are not negligible between the communication devices and that the communication devices have internal oscillators that are not perfectly identical, each communication device has its own clock timing, i.e. its own view of the clock timing defining the transmission cycles.

In addition, even though a distributed consensus-based algorithm is used in a given cluster, interferences may occur due to clock drift between clusters. The description hereafter with regard to FIGS. 7 to 13 particularly aims at addressing this issue.

FIG. 3a schematically represents an architecture of the concentrator device 110. The concentrator device 110 may correspond to any concentrator device 110m, wherein m=a, b or c with reference to FIG. 2.

According to the shown architecture, the concentrator device 110 comprises the following components interconnected by a communications bus 306: a processor, microprocessor, microcontroller or CPU (Central Processing Unit) 300; a RAM (Random-Access Memory) 301; a ROM (Read-Only Memory) 302; an SD (Secure Digital) card reader 303, or any other device adapted to read information stored on storage means; a first communication interface 304 and a second communication interface 305.

The first communication interface 304 allows the concentrator device 110 to wirelessly communicate with neighbouring smart meters in the mesh communications network 100.

The second communication interface 305 allows the concentrator device 110 to communicate with the server 230.

CPU 300 is capable of executing instructions loaded into RAM 301 from ROM 302 or from an external memory, such as an SD card. After the concentrator device 110 has been powered on, CPU 300 is capable of reading instructions from RAM 301 and executing these instructions. The instructions form one computer program that causes CPU 300 to perform some or all of the steps of the algorithms described hereafter with regard to FIGS. 5, 7, 9, 10, 11 and 13.

Any and all steps of the algorithms described hereafter with regard to FIGS. 5, 7, 9, 10, 11 and 13 may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

FIG. 3b schematically represents an architecture of the server device 230.

According to the shown architecture, the server device 230 comprises the following components interconnected by a communications bus 316: a processor, microprocessor, microcontroller or CPU 310; a RAM 311; a ROM 312; an HDD (Hard Disk Drive) 313, or any other device adapted to read information stored on storage means; a communication interface 314.

The communication interface 314 allows the server device 230 to communicate with the concentrator devices 110a, 110b, 110c.

CPU 310 is capable of executing instructions loaded into RAM 311 from ROM 312 or from an external memory, such as the HDD 313. After the server device 230 has been powered on, CPU 310 is capable of reading instructions from RAM 311 and executing these instructions. The instructions form one computer program that causes CPU 310 to perform some or all of the steps of the algorithm described hereafter with regard to FIG. 8.

Any and all steps of the algorithm described hereafter with regard to FIG. 8 may be implemented in software by execution of a set of instructions or program by a programmable computing machine, such as a PC, a DSP or a microcontroller; or else implemented in hardware by a machine or a dedicated component, such as an FPGA or an ASIC.

FIG. 4 schematically represents an architecture of a smart meter 120. The smart meter 120 corresponds to any smart meter 120i, wherein i=a, b, . . . , g with reference to FIG. 1.

According to the shown architecture, the smart meter 120 comprises the following components interconnected by a communications bus 406: a processor, microprocessor, microcontroller or CPU 400; a RAM 401; a ROM 402; an SD card reader 403, or any other device adapted to read information stored on storage means; a communication interface 404; and a metering interface 405.

The first communication interface 404 allows the smart meter 120 to wirelessly communicate with any neighbouring device in the wireless mesh communications network 100 or in the communications network 200, said neighbouring device being either another smart meter or a concentrator device.

The metering interface 405 allows the smart meter 120 to perform monitoring, measurements and data captures, such as electrical or water consumption data. The metering interface 405 allows the smart meter 120 to transmit commands to the monitored system.

CPU 400 is capable of executing instructions loaded into RAM 401 from ROM 402 or from an external memory, such as an SD card. After the smart meter device 120 has been powered on, CPU 400 is capable of reading instructions from RAM 401 and executing these instructions. The instructions form one computer program that causes CPU 400 to perform some or all of the steps of the algorithms described hereafter with regard to FIGS. 6 and 12.

Any and all steps of the algorithm described hereafter with regard to FIGS. 6 and 12 may be implemented in software by execution of a set of instructions or program by a programmable computing machine, such as a PC, a DSP or a microcontroller; or else implemented in hardware by a machine or a dedicated component, such as an FPGA or an ASIC.

FIG. 5 schematically represents an algorithm for performing synchronization and clock drift compensation, performed by the concentrator device 110.

The algorithm of FIG. 5 is preferably repeated on a predefined time period basis.

In a step S501, the concentrator device 110 receives synchronization signals from its neighbouring devices, i.e. the smart meters 120a and 120b. These synchronization signals are transmitted during a distributed consensus-based synchronization performed by the smart meters 120i, wherein i=a, b, . . . , g, as detailed hereafter with regard to FIG. 6. These synchronization signals allow the concentrator device 110 to determine a clock timing resulting from the distributed consensus-based synchronization performed by the smart meters 120i. It can be noticed that the observations made by the concentrator device 110 suffer from the propagation delays between the smart meters 120a, 120b and the concentrator device 110.

In other words, the concentrator device 110 observes the course of the distributed consensus-based synchronization performed by the smart meters 120i, by measuring a timing misalignment expressed as follows:

$$t_{j,n-1}+\epsilon_j+\tau_{0,j}-t_{0,n-1}$$

wherein the concentrator device 110 has the index 0 and wherein n is the index of the considered iteration of the algorithm;
and wherein:
$t_{j,n-1}$ is the clock timing of the j-th communication device at the iteration n-1 of the algorithm, i.e. one considered smart meter among smart meters 120a, 120b from the standpoint of the concentrator device 110;
$\epsilon_j$ is the clock drift of the j-th communication device;
$\tau_{0,j}$ is the propagation delay between the concentrator device 110 and the j-th communication device.

In a following step S502, the concentrator device 110 determines a relative clock timing difference between the clock timing resulting from the distributed consensus-based synchronization performed by the smart meters 120i and a reference clock timing.

The reference clock timing is preferably derived from an internal clock of the concentrator device 110, but may also be derived from an external clock.

In a following step S503, the concentrator device 110 obtains a correction information to be used by the smart meters in order to compensate the clock drift resulting from the distributed consensus-based synchronization and ensure synchronization. The correction information is derived at least from a difference between a clock timing resulting from the distributed consensus-based synchronization and a reference clock timing. More particularly, in the scope of the wireless mesh communications network 100 of FIG. 1, the concentrator device 110 determines, from the determined clock timing difference, a correction information to be used by the smart meters in order to compensate the clock drift resulting from the distributed consensus-based synchronization. Furthermore, as detailed in other embodiments hereafter with regard to FIGS. 7 to 13, in the scope of the wireless mesh communications network 200 of FIG. 2, the concentrator device obtains a correction information derived from differences between clock timings resulting from respective distributed consensus-based synchronizations of the clusters 100a, 100b, 100c and a reference clock timing.

A combination of the clock timing differences with the neighbouring smart meters may be expressed as follows:

$$\hat{t}_{0,n}=t_{0,n-1}+T+f(\{\forall j\in\Omega_n(0),t_{j,n-1}+\epsilon_j+\tau_{0,j}-t_{0,n-1}\})$$

wherein:
T is the reference time period between two iterations of the algorithm;
$\Omega_n(0)$ is the set of indexes of neighbouring devices from which the concentrator device 110 received synchronization signals at the iteration n of the algorithm, i.e. the smart meter 120a and/or the smart meter 120b;
$\{\forall j\in\Omega_n(0), t_{j,n-1}+\epsilon_j+\tau_{0,j}-t_{0,n-1}\}$ is the set of relative clock timing differences determined by the concentrator device 110 at the iteration n of the algorithm;
$f(.)$ is a combination function, which may be defined as:

$$f(\alpha_1, \ldots, \alpha_M) = \frac{1}{M}\sum_{m=1}^{M}\alpha_m$$

It can be noticed that, as the concentrator device 110 provides the reference clock timing:

$$t_{0,n}=t_{0,n-1}+T$$

In other words, the concentrator device 110 determines the clock timing $\hat{t}_{0,n}$ resulting from the observation of the distributed consensus-based synchronization performed by the smart meters 120i, but doesn't update its own clock timing $t_{0,n}$, as it remains the reference clock timing.

The correction value $\xi_n$ corresponding to the correction information is then determined by:

$$\xi_n=\hat{t}_{0,n}-t_{0,n-1}-T$$

In other words, the correction information is the correction value $\xi_n$ or an information representative of the correction value $\xi_n$ or a filtered value of the correction values $\xi_n$ determined over several iterations of the algorithm or an information representative of such filtered value. Let's denote hereinafter $\xi$ the correction value corresponding to the value propagated in the wireless mesh communications network 100.

In a following step S504, the concentrator device 110 transmits the correction information throughout the wireless mesh communications network 100. In other words, in view of the wireless mesh communications network 100 shown in FIG. 1, the concentrator device 110 transmits the correction information to its neighbouring devices, i.e. the smart meters 120a and 120b. The smart meters 120a and 120b then relay the correction information to their respective neighbouring devices except the concentrator device 110, i.e. the smart meters 120c et 120d, and so on. The relaying of the correction information is further detailed hereafter with regard to FIG. 6.

FIG. 6 schematically represents an algorithm for performing synchronization and clock drift compensation, performed by the smart meter 120. The algorithm shown in FIG. 6 is performed in conjunction with the algorithm shown in FIG. 5.

The algorithm shown in FIG. 6 may also be performed in conjunction with the algorithms shown in FIGS. 7 and 8, or with the algorithm shown in FIG. 9.

The algorithm of FIG. 6 is preferably repeated on a predefined time period basis.

In a step S600, the smart meter 120 performs, in conjunction with the other smart meters of the wireless mesh communications network 100, a distributed consensus-based synchronization. The smart meters show their own view of the clock timing by transmitting synchronization signals. The synchronization signals are expected to be transmitted at a predefined instant. As the views of the clock timing differ from one communication device to another, the synchronization signals are transmitted at different instants; and, due to the propagation time periods between the communication devices, the synchronization signals are received at yet different instants. The goal of the distributed consensus-based synchronization is for the smart meters to converge toward a same view of the clock timing. To do so, each smart meter combines its own view of the clock timing with the observations of the clock timings shown by its neighbouring devices. By adjusting in this way the smart meters' own clock timings according to the others, a better synchronization is achieved. This allows for instance reducing the inter-communications gaps, thus increasing the network throughput, or for instance limiting the interferences in TDMA communications or allowing latency reduction in the wireless mesh communications network 100 by using low-latency multi-hop relaying protocols.

The step S600 is detailed in the algorithm schematically represented in FIG. 6 by the steps S601 to S606.

In the step S601, the smart meter 120 selects either the transmission mode or the reception mode, when the communication devices use half-duplex communications; otherwise, when the communication devices use full-duplex communications, the transmission of signals and the reception of signals are performed in parallel.

The selection between the transmission mode and the reception mode may be randomly performed. In a variant, the selection between the transmission mode and the reception mode may be made according to a predetermined sequence.

In the following step S602, it is checked whether the transmission mode or the reception mode is selected. If the transmission mode is selected, the step S603 is performed; otherwise, the step S604 is performed.

In the step S603, the smart meter 120 transmits synchronization signals to its neighbouring devices in the wireless mesh communications network 100. The synchronization signals are signals of predefined shape and/or contents, with auto-correlation and inter-correlation characteristics.

The transmitted synchronization signals are aligned with the clock timing of the smart meter 120. In other words, the smart meter 120 is expected to transmit synchronization signals at a given instant defined according to the reference clock timing. The smart meter 120 being driven by the result of the distributed consensus-based synchronization and, less importantly by its own oscillator, it transmits instead the synchronization signals at the given instant, but defined according to its own clock timing. In addition, the propagation time periods between the communication devices increase the difference between the given instant defined according to the reference clock timing and the instant at which the synchronization signals are effectively received. A synchronization period is therefore defined in order to allow the communication devices to transmit the synchronization signals, the synchronization period corresponding to a margin around the given instant to take into account possible clock drift due to misalignment resulting from the distributed consensus-based synchronization, due to propagation time periods and due to tolerance in the smart meters' oscillators performance.

Once the step S603 is performed, the algorithm ends.

In the step S604, the smart meter 120 receives synchronization signals from at least one of its neighbouring devices. These synchronization signals are the signals transmitted by said neighbouring devices when they perform the step S603.

In the following step S605, the smart meter 120 determines a relative clock timing difference between the clock timing resulting from the synchronization signals received from its neighbouring devices and its own clock timing, expressed as follows:

$$t_{j,n-1} + \epsilon_j + \tau_{k,j} - t_{k,n-1} - \epsilon_k$$

wherein:

k is the index of the considered smart meter;

$t_{k,n-1}$ is the clock timing of the considered smart meter at the iteration n−1 of the algorithm;

$\epsilon_k$ is the clock drift of the considered smart meter;

$\tau_{k,j}$ is the propagation delay between the considered smart meter and the j-th smart meter;

In the following step S606, the smart meter 120 updates its own clock timing on the basis of the relative clock timing difference determined in the step S605. In other words, the smart meter 120 adjusts its own clock timing to match a value corresponding to a consensus between its own clock timing and the clock timings observed from its neighbouring devices.

In a following step S607, the smart meter 120 receives a correction information, as transmitted by the concentrator device 110 in the step S504.

In a following step S608, the smart meter 120 updates its own clock timing on the basis of the received correction information. In other words, the smart meter 120 adjusts its own clock timing with a correction value corresponding to the correction information received from the concentrator device 110.

For instance, the updating of the smart meter's own clock timing can be performed as follows:

$$t_{k,n} = t_{k,n-1} + T + \epsilon_k + f(\{\forall j \in \Omega_n(k), t_{j,n-1} + \epsilon_j + \tau_{k,j} - t_{k,n-1} - \epsilon_k\}) - \xi$$

wherein:

k is the index of the considered smart meter;

$\xi$ is the correction value corresponding to the correction information received from the concentrator device 110.

In a following step S609, the smart meter 120 relays the received correction information to its neighbouring smart meters in the wireless mesh communications network 100.

The message or packet or frame field in which the correction information is relayed preferably comprises a correction information identifier, which avoids that a same correction information loops in the wireless mesh communications network. When a communication device receives a correction information with an already-received identifier, the communication device discards the correction information and doesn't relay it.

It can be noted that the steps S607 to S609 may be performed in parallel to the steps S601 to S606.

It can be noted that the correction value may be gradually applied to the smart meter's own clock timing. It means that the correction may be spread over several clock cycles, in order to smoothen the variations in cycle length.

It can be understood from the algorithms of FIGS. 5 and 6 that all the communication devices of the wireless mesh communications network 100 except the concentrator device 110 participate in the distributed consensus-based synchronization by transmitting synchronization signals and update accordingly their respective internal clock timings. The concentrator device 110 doesn't participate in the distributed consensus-based synchronization and doesn't transmit synchronization signals and doesn't update its internal clock timing. However, the concentrator device 110 observes the evolution of the distributed consensus-based synchronization performed by the smart meters 120$i$, wherein i=a, b, . . . , g, and broadcasts correction information in order to avoid any drift of the clock timing resulting from the distributed consensus-based synchronization compared to the reference clock.

If the concentrator device 110 would participate in the distributed consensus-based synchronization by transmitting synchronization signals on its turn, the communication devices would converge toward a substantially identical clock timing, but it would suffer from clock drift, which may result in a transmission frequency shift. By observing the evolution of the distributed consensus-based synchronization performed by the smart meters 120$i$, wherein i=a, b, . . . , g, and by broadcasting correction information in order to avoid any drift of the clock timing resulting from the distributed consensus-based synchronization, the concentrator device 110 allows avoiding such a transmission frequency shift, allows ensuring the devices clock timing alignment and thus allows increasing the communications network overall performance.

FIG. 7 schematically represents an algorithm for performing synchronization and clock drift compensation, performed by the concentrator devices 110*a*, 110*b*, 110*c* of the communications network 200. Let's consider that the algorithm is performed by the concentrator device 110*a*.

The algorithm of FIG. 7 is preferably repeated on a predefined time period basis.

In a step S701, the concentrator device 110*a* receives synchronization signals from its neighbouring devices, i.e. the smart meters 120*a* and 120*b* when considering that the cluster 100*a* corresponds to the wireless mesh communications network 100 of FIG. 1. These synchronization signals result from a distributed consensus-based synchronization performed by the smart meters 120*i*, wherein i=a, b, . . . , g, as already detailed with regard to FIG. 6. These synchronization signals allow the concentrator device 110*a* to determine a clock timing resulting from the distributed consensus-based synchronization performed by the smart meters 120*i*.

In other words, the concentrator device 110*a* observes the course of the distributed consensus-based synchronization performed by the smart meters of the cluster 100*a*.

In a following step S702, the concentrator device 110*a* determines a relative clock timing difference between the clock timing resulting from the distributed consensus-based synchronization performed by the smart meters 120*i* and a reference clock timing. The reference clock timing may be derived from an external clock provided by a GPS. Another approach for defining the reference clock timing is detailed hereafter with regard to FIGS. 10 and 11. Yet another approach for defining the reference clock timing is detailed hereafter with regard to FIGS. 12 and 13.

In a following step S703, the concentrator device 110*a* obtains a local correction information, which corresponds to the correction information obtained in the step S503 in the scope of the wireless mesh communications network 100 of FIG. 1. In other words, the local correction information is derived from the determined clock timing difference.

In a following step S704, the concentrator device 110*a* transmits the obtained local correction information to the server device 230.

In a following step S705, the concentrator device 110*a* receives a global correction information from the server device 230. As detailed hereafter with regard to FIG. 8, the global correction information is derived from the differences between the clock timings resulting from the respective distributed consensus-based synchronizations of the clusters 100*a*, 100*b*, 100*c* and the reference clock timing.

In a following step S706, the concentrator device 110*a* transmits the received global correction information throughout the cluster 100*a*. In other words, when considering that the cluster 100*a* corresponds to the wireless mesh communications network 100 of FIG. 1, the concentrator device transmits the global correction information to its neighbouring devices, i.e. the smart meters 120*a* and 120*b*. The smart meters 120*a* and 120*b* then relay the correction information to their respective neighbouring devices except the concentrator device 110*a*, i.e. the smart meters 120*c* et 120*d*, and so on.

FIG. 8 schematically represents an algorithm for performing synchronization and clock drift compensation, performed by the server device 230 of the communications network 200. The algorithm of FIG. 8 is performed in conjunction with the algorithm of FIG. 7.

When the algorithm of FIG. 8 starts, the server device 230 waits for receiving local correction information from the concentrator devices 110*a*, 110*b*, 110*c*.

In a step S801, the server device 230 receives local correction information from each concentrator device 110*a*, 110*b*, 110*c*. In other words, the server device 230 receives the local correction information determined by the concentrator device 110*a* for the cluster 100*a*, the local correction information determined by the concentrator device 110*b* for the cluster 100*b* and the local correction information determined by the concentrator device 110*c* for the cluster 100*c*.

In a following step S802, the server device 230 determines a global correction information to be applied within all the clusters 100*a*, 100*b* and 100*c*. The global correction information results from a combination of the received local correction information. For instance, the global correction information is an arithmetic mean of the values of the received local correction information, or the global correction information is a weighted mean of the values of the received local correction information, the weight applied to each local correction information being determined on the basis of the number of communication devices in the corresponding clusters 100*a*, 100*b*, 100*c* or on the basis of the number of neighbouring devices of the corresponding concentrator devices 110*a*, 110*b*, 110*c*.

In a following step S803, the server device 230 transmits the determined global correction information to each concentrator device 110*a*, 110*b*, 110*c*.

Therefore, as the concentrator devices 110*a*, 110*b*, 110*c* transmit the same global correction information throughout their respective clusters 100*a*, 100*b*, 100*c*, all the smart meters of the communications network 200 apply the same correction information to their own clock timings. This approach is particularly suitable when the clusters 100*a*, 100*b*, 100*c* are sufficiently close to each other so that at least one smart meter of one cluster can receive synchronization signals from at least one smart meter of another cluster and further takes into account these synchronization signals in the distributed consensus-based synchronization of its cluster.

Then, the server device 230 waits for receiving updated local correction information from the concentrator devices 110*a*, 110*b*, 110*c*.

FIG. 9 schematically represents another algorithm for performing synchronization and clock drift compensation, performed by the concentrator devices 110a, 110b, 110c of the communications network 200. Let's consider that the algorithm is performed by the concentrator device 110a.

The algorithm of FIG. 9 is preferably repeated on a predefined time period basis.

In a step S901, the concentrator device 110a receives synchronization signals from its neighbouring devices, i.e. the smart meters 120a and 120b when considering that the cluster 100a corresponds to the wireless mesh communications network 100 of FIG. 1. These synchronization signals result from a distributed consensus-based synchronization performed by the smart meters 120i, wherein i=a, b, . . . , g, as already detailed with regard to FIG. 6. These synchronization signals allow the concentrator device 110a to determine a clock timing resulting from the distributed consensus-based synchronization performed by the smart meters 120i.

In other words, the concentrator device 110a observes the course of the distributed consensus-based synchronization performed by the smart meters of the cluster 100a.

In a following step S902, the concentrator device 110a determines a relative clock timing difference between the clock timing resulting from the distributed consensus-based synchronization performed by the smart meters 120i and a reference clock timing. The reference clock timing may be derived from an external clock provided by a GPS.

In a following step S903, the concentrator device 110a obtains a local correction information, which corresponds to the correction information obtained in the step S503 in the scope of the wireless mesh communications network 100 of FIG. 1. In other words, the local correction information is derived from the determined clock timing difference.

In a following step S904, the concentrator device 110a transmits the obtained local correction information to the other concentrator devices 110b, 110c.

In a following step S905, the concentrator device 110a receives other local correction information from the other concentrator devices 110b, 110c. In other words, the concentrator device 110a receives the local correction information determined by the concentrator device 110b for the cluster 100b and the local correction information determined by the concentrator device 110c for the cluster 100c.

In a following step S906, the concentrator device 110a determines a global correction information to be applied within all the clusters 100a, 100b and 100c. The global correction information results from a combination of the received local correction information, similarly as performed by the server device 230 in the step S802.

All the concentrator devices 110a, 110b, 110c perform the same process to determine the global correction information. Therefore the same global correction information is applied within all the clusters 100a, 100b and 100c.

In a following step S907, the concentrator device 110a transmits the determined global correction information throughout the cluster 100a. In other words, when considering that the cluster 100a corresponds to the wireless mesh communications network 100 of FIG. 1, the concentrator device 110a transmits the global correction information to its neighbouring devices, i.e. the smart meters 120a and 120b. The smart meters 120a, 120b then relay the correction information to their respective neighbouring devices except the concentrator device 110a, i.e. the smart meters 120c and 120d, and so on.

Therefore, as the concentrator devices 110a, 110b, 110c transmit the same global correction information throughout their respective clusters 100a, 100b, 100c, all the smart meters of the communications network 200 apply the same correction information to their own clock timings. This approach is particularly suitable when the clusters 100a, 100b, 100c are sufficiently close to each other so that at least one smart meter of one cluster can receive synchronization signals from at least one smart meter of another cluster and further takes into account these synchronization signals in the distributed consensus-based synchronization of its cluster.

FIG. 10 schematically represents yet another algorithm for performing synchronization and clock drift compensation, performed by a concentrator device of the wireless mesh communications network 200. The algorithm shown in FIG. 10 is performed in conjunction with the algorithm shown in FIG. 11 and detailed hereafter.

In the scope of the execution of the algorithms of FIGS. 10 and 11, the concentrator devices 110a, 110b and 110c form a second level of mesh communications network. The concentrator devices 110a, 110b and 110c are preferably wirelessly interconnected, although they may be interconnected by optical links or wires.

The global principle of the algorithms of FIGS. 10 and 11 is to use a distributed consensus-based synchronization among the concentrator devices 110a, 110b, 110c to define the reference clock timing. In this case, there are two stages of distributed consensus-based synchronization applied on a different resource such as time or frequency. A first stage is performed in each cluster by the smart meters and a second stage is performed among the concentrator devices.

More stages of distributed consensus-based synchronization may be implemented in a similar manner.

One concentrator device is defined, elected or selected as the reference. Let's call it reference concentrator device, and let's consider this reference concentrator device is the concentrator device 110a. The concentrator devices 110b, 110c are then referred to as slave concentrator devices.

The algorithm of FIG. 10 is performed by each slave concentrator device 110b, 110c and is preferably repeated on a predefined time period basis. Let's consider for the detailed description hereafter that the algorithm is performed by the slave concentrator device 110b.

In a step S1000, the slave concentrator device 110b performs, in conjunction with the other slave concentrator devices of the communications network 200, a distributed consensus-based synchronization. The slave concentrator devices show their own view of the clock timing by transmitting synchronization signals. The synchronization signals are expected to be transmitted at a predefined instant. As the views of the clock timing differ from one concentrator device to another, the synchronization signals are transmitted at different instants; and, due to propagation time periods between the concentrator devices, the synchronization signals are received at yet different instants. The goal of the distributed consensus-based synchronization is for the slave concentrator devices to converge toward a same view of the clock timing. To do so, each slave concentrator device combines its own view of the clock timing with the observation of the clock timings shown by the other slave concentrator devices.

The step S1000 is detailed in the algorithm schematically represented in FIG. 10 by the steps S1001 to S1006.

In the step S1001, the slave concentrator device 110b selects either the transmission mode or the reception mode, when the concentrator devices use half-duplex communications; otherwise, when the concentrator devices use full-duplex communications, the transmission of signals and the reception of signals are performed in parallel.

The selection between the transmission mode and the reception mode may be randomly performed. In a variant, the selection between the transmission mode and the reception mode may be made according to a predetermined sequence.

In the following step S1002, it is checked whether the transmission mode or the reception mode is selected. If the transmission mode is selected, the step S1003 is performed; otherwise, the step S1004 is performed.

In the step S1003, the slave concentrator device 110b transmits synchronization signals to at least one other slave concentrator device 110c in the communications network 200. The synchronization signals are signals of predefined shape and/or contents, with auto-correlation and inter-correlation characteristics. The transmitted synchronization signals may be received by the reference concentrator device 110a.

The transmitted synchronization signals are aligned with the clock timing of the slave concentrator device 110b. In other words, the slave concentrator device 110b is expected to transmit synchronization signals at a given instant defined according to the reference clock timing. The slave concentrator device 110b being driven by the result of the distributed consensus-based synchronization and, less importantly by its own oscillator, it transmits instead the synchronization signals at the given instant, but defined according to its own clock timing. In addition, the propagation time periods between the concentrator devices increase the difference between the given instant defined according to the reference clock timing and the instant at which the synchronization signals are effectively received. A synchronization period is therefore defined in order to allow the concentrator devices to transmit the synchronization signals, the synchronization period corresponding to a margin around the given instant to take into account possible clock drift due to misalignment resulting from the distributed consensus-based synchronization and due to tolerance in the slave concentrator devices' oscillators performance.

Once the step S1003 is performed, the algorithm ends.

In the step S1004, the slave concentrator device 110b receives synchronization signals from at least one other slave concentrator device 110c. These synchronization signals are the signals transmitted by said slave concentrator devices when they perform the step S1003.

In the following step S1005, the slave concentrator device 110b determines a relative clock timing difference between the clock timing resulting from the synchronization signals received from said other slave concentrator devices 110c and its own clock timing.

In the following step S1006, the slave concentrator device 110b updates its own clock timing on the basis of the relative clock timing difference determined in the step S1005. In other words, the slave concentrator device 110b adjusts its own clock timing to match a value corresponding to a consensus between its own clock timing and the clock timings of said other slave concentrator devices.

In a following step S1007, the slave concentrator device 110b receives a correction information, as transmitted by the reference concentrator device 110a in the step S1104, as detailed hereafter with regard to FIG. 11.

In a following step S1008, the slave concentrator device 110b updates its own clock timing on the basis of the received correction information. In other words, the slave concentrator device 110b adjusts its own clock timing with a correction value corresponding to the correction information received from the reference concentrator device 110a.

For instance, the updating of the slave concentrator device's own clock timing can be performed as follows:

$$t_{k',n'} = t_{k',n'-1} + T' + \epsilon'_{k'} + g(\{\forall j' \in \Omega'_n(k'), t_{j',n'-1} + \epsilon'_{j'} + \tau'_{k',j'} - t_{k',n'-1} - \epsilon'_{k'}\}) - \xi'$$

wherein:

n' is the index of the considered iteration of the algorithm;

k' is the index of the considered slave concentrator device 110b;

$t_{j',n'-1}$ is the clock timing of the j'-th communication device at the iteration n'-1 of the algorithm;

T' is the reference time period between two iterations of the algorithm;

$\epsilon'_{j'}$ is the clock drift of the j'-th communication device;

$\Omega'_n(k')$ is the set of indexes of slave concentrator devices from which the slave concentrator device 110b received synchronization signals at the iteration n' of the algorithm;

$\tau'_{k',j'}$ is the propagation delay between the slave concentrator device 110b and the j'-th slave concentrator device;

$\{\forall j' \in \Omega'_n(k'), t_{j',n'-1} + \epsilon'_{j'} + \tau'_{k',j'} - t_{k',n'-1}\}$ is the set of relative clock timing differences determined by the slave concentrator device 110b at the iteration n' of the algorithm;

g(.) is a combination function, which may be defined similarly as the already-mentioned combination function f(.); and ξ is the correction value corresponding to the correction information received from the reference concentrator device 110a.

In a following step S1009, the slave concentrator device 110b relays the received correction information to other slave concentrator devices in the communications network 200.

The message or packet or frame field in which the correction information is relayed preferably comprises a correction information identifier, which avoids that a same correction information loops in the communications network 200. When a slave concentrator device receives a correction information with an already-received identifier, the slave concentrator device discards the correction information and doesn't relay it.

It can be noted that the steps S1007 to S1009 may be performed in parallel to the steps S1001 to S1006.

It can be noted that the correction value may be gradually applied to the slave concentrator device's own clock timing. It means that the correction may be spread over several clock cycles, in order to smoothen the variations in cycle length.

The clock timing adjustments performed in the steps S1006 and S1008 have therefore an impact on the reference clock timing of the cluster 100b to which the slave concentrator device 110b belongs and consequently on the correction value propagated in the execution of the algorithms of FIGS. 5 and 6.

FIG. 11 schematically represents yet another algorithm for performing synchronization and clock drift compensation, performed by a concentrator device of the communications network 200. The algorithm of FIG. 11 is performed in conjunction with the algorithm of FIG. 10. The algorithm of FIG. 11 is performed by the reference concentrator device 110a.

The algorithm of FIG. 11 is preferably repeated on a predefined time period basis.

In a step S1101, the reference concentrator device 110 receives synchronization signals from at least one slave concentrator device 110b, 110c. These synchronization signals are transmitted during a distributed consensus-based synchronization performed by the slave concentrator devices, as detailed hereinbefore with regard to FIG. 10. These synchronization signals allow the reference concentrator device 110a to determine a clock timing resulting from the distributed consensus-based synchronization performed by the slave concentrator devices 110b, 110c.

In other words, the reference concentrator device 110a observes the course of the distributed consensus-based synchronization performed by the slave concentrator devices 110b, 110c.

In a following step S1102, the reference concentrator device 110a determines a relative clock timing difference between the clock timing resulting from the distributed consensus-based synchronization performed by the slave concentrator devices 110b, 110c and its own clock timing, which is used as reference in the communications network 200.

The reference clock timing is preferably derived from an internal clock of the reference concentrator device 110a, but may also be derived from an external clock.

In a following step S1103, the reference concentrator device 110a determines a correction information to be used by the slave concentrator devices 110b, 110c in order to compensate the clock drift resulting from the distributed consensus-based synchronization. The correction information is derived at least from a difference between a clock timing resulting from the distributed consensus-based synchronization and the reference clock timing. More particularly, in the scope of the communications network 200, the reference concentrator device 110a determines, from the determined clock timing difference, a correction information to be used by the slave concentrator devices 110b, 110c in order to compensate the clock drift resulting from the distributed consensus-based synchronization and in order to ensure synchronization.

A combination of the clock timing differences with the slave concentrator devices may be expressed as follows:

$$\hat{t}_{0,n'} = t_{0,n'-1} + T' + g(\{\forall j' \in \Omega'_{n'}(0), t_{j',n'-1} + \epsilon'_j + \tau'_{0,j} - t_{0,n'-1}\})$$

wherein the reference concentrator device 110a has the index 0.

It can be noticed that, as the reference concentrator device 110a provides the reference clock timing:

$$t_{0,n'} = t_{0,n'-1} + T'$$

In other words, the reference concentrator device 110a determines the clock timing $\hat{t}_{0,n'}$ resulting from the observation of the distributed consensus-based synchronization performed by the concentrator devices 110b, 110c, but doesn't update its own clock timing $t_{0,n'}$, as it remains the reference clock timing.

The correction value $\xi'$ corresponding to the correction information is then determined by:

$$\xi' = \hat{t}_{0,n'} - t_{0,n'-1} - T'$$

In other words, the correction information is the correction value $\xi'$ or an information representative of the correction value $\xi'$ or a filtered value of the correction values $\xi'$ determined over several iterations of the algorithm or an information representative of such filtered value.

In a following step S1104, the reference concentrator device 110a transmits the correction information throughout the communications network 200. The transmitted correction information is addressed to the slave concentrator devices 110b, 110c of the communications network 200. The propagation of the correction information is ensured by the relaying performed by the slave concentrator devices, as already detailed hereinbefore with regard to FIG. 10.

It can be understood from the algorithms of FIGS. 10 and 11 that all the concentrator devices of the communications network 200 except the reference concentrator device 110a participate in the distributed consensus-based synchronization by transmitting synchronization signals and update accordingly their respective internal clock timings, which is used as reference in their respective clusters. The reference concentrator device 110a doesn't participate in the distributed consensus-based synchronization and doesn't transmit synchronization signals and doesn't update its internal clock timing. However, the reference concentrator device 110a observes the evolution of the distributed consensus-based synchronization performed by the slave concentrator devices 110b, 110c, and broadcasts correction information in order to ensure synchronization and avoid any drift of the clock timing resulting from the distributed consensus-based synchronization compared to the reference clock.

FIG. 12 schematically represents another algorithm for performing synchronization and clock drift compensation, performed by the smart meter 120, in the scope of the communications network 200.

In the communications network 200, smart meters may have neighbouring devices belonging to different clusters. It has already been mentioned that such smart meters may take into account, in the distributed consensus-based synchronization in their cluster, synchronization signals transmitted by neighbouring smart meters belonging to other clusters.

Therefore, such smart meters may be in conditions for receiving the correction information propagated in such other clusters. This allows such smart meters to be in conditions for participating to the distributed consensus-based synchronization of said other clusters. In addition, such smart meters can generate synchronization signals representative of their own views of the clock timings resulting from the distributed consensus-based synchronization of said other clusters and further relay the correction information propagated in such other clusters.

With this approach, all smart meters of the communications network 200 are in conditions for participating to the distributed consensus-based synchronization for any cluster 100a, 100b, 100c of the communications network 200. This approach is particularly useful when there is no direct communications between the concentrator devices 110a, 110b, 110c of the communications network 200 and when there is no common external reference clock timing for all said concentrator devices 110a, 110b, 110c.

The algorithm of FIG. 12 starts with the step S600, in which the smart meter 120 performs a distributed consensus-based synchronization in collaboration with the other smart meters of the communications network 200 for a given cluster 100a, 100b or 100c.

In a following step S1201, the smart meter 120 receives a correction information for the given cluster 100a, 100b or 100c, either from a neighbouring smart meter in its cluster or from a neighbouring communication device from another cluster.

In a following step S1202, the smart meter 120 updates the clock timing, for the given cluster 100a, 100b or 100c, on the basis of the received correction information.

In a following step S1203, the smart meter 120 relays the received correction information to its neighbouring communication devices.

In a following step S1204, the smart meter 120 checks whether distributed consensus-based synchronization for all clusters has been performed. If this is the case, then a step S1205 is performed; otherwise, the step S600 is repeated for another cluster.

In the step S1205, the smart meter 120 aligns its communications on the clock timing representative of its own cluster, i.e. on the clock timing resulting from the distributed consensus-based synchronization performed by all the smart meters of the communications network 200 for the cluster to which said smart meter 120 belongs.

In other words, the smart meter 120 uses, for communicating, the clock timing resulting from the distributed consensus-based synchronization performed by all the smart meters of the communications network 200 for the cluster to which said smart meter 120 belongs and the smart meter 120 also transmits synchronization signals for distributed consensus-based synchronization performed by all the smart meters of the communications network 200 for at least one other cluster. The synchronization signals are resulting from the distributed consensus-based synchronization performed for a given cluster and are not a priori aligned with the synchronization signals resulting from the distributed consensus-based synchronization performed for another cluster. Synchronization, i.e. alignment, is actually achieved thanks to the process performed by the concentrator devices 110a, 110b, 110c, as detailed hereafter with regard to FIG. 13.

It can be noted that the steps S600 and S1201 to S1203 may be performed in parallel independently for each cluster 100a, 100b, 100c. Then, the step S1205 is performed in a separated process or sequentially with the execution of the steps S600 and S1201 to S1203 for the cluster to which said smart meter 120 belongs.

FIG. 13 schematically represents yet another algorithm for performing synchronization and clock drift compensation, performed by a concentrator device of the communications network 200. The algorithm of FIG. 13 is performed in conjunction with the algorithm of FIG. 12. Let's consider that the algorithm of FIG. 13 is performed by the concentrator device 110a.

The algorithm of FIG. 13 is preferably repeated on a predefined time period basis.

In a step S1301, the concentrator device 110a receives synchronization signals from its neighbouring devices. These synchronization signals are transmitted during a distributed consensus-based synchronization performed by the smart meters of the communications network 200, as detailed hereinbefore with regard to FIG. 12. These synchronization signals allow the concentrator device 110a to determine a clock timing resulting from distributed consensus-based synchronizations performed by the smart meters of the communications network 200 for each cluster 100a, 100b, 100c.

In other words, the concentrator device 110a observes the course of the distributed consensus-based synchronization performed by the smart meters of the communications network 200 for a given cluster 100a, 100b or 100c, by measuring a timing misalignment expressed as follows:

$$t_{j,n-1} + \epsilon_j \tau_{0,j} - t_{0,n-1}$$

wherein the concentrator device 110a has the index 0 and wherein n is the index of the considered iteration of the algorithm for the given cluster 100a, 100b or 100c;
and wherein:
$t_{j,n-1}$ is the clock timing of the j-th communication device at the iteration n−1 of the algorithm for the given cluster 100a, 100b or 100c;
$\epsilon_j$ is the clock drift of the j-th communication device, corresponding to the clock timing for the given cluster 100a, 100b or 100c;
$\tau_{0,j}$ is the propagation delay between the concentrator device 110a and the j-th communication device.

In a following step S1302, the concentrator device 110a determines a relative clock timing difference between the clock timing resulting from the distributed consensus-based synchronization performed by the smart meters for the given cluster 100a, 100b or 100c and a reference clock timing.

In a following step S1303, the concentrator device 110a checks whether distributed consensus-based synchronization for all clusters have been observed. If this is the case, then a step S1304 is performed; otherwise, the step S1301 is repeated for another cluster.

In the step S1304, the concentrator device 110a adjusts the reference clock timing on the basis of the relative clock differences determined in the step S1302 for each cluster 100a, 100b, 100c. In other words, the concentrator device 110a adjusts the reference clock timing by a combination of the reference clock timing and clock timings resulting from the distributed consensus-based synchronizations performed by the smart meters of the communications network 200 for the all clusters 100a, 100b, 100c.

In a following step S1305, the concentrator device 110a obtains a correction information to be used by the smart meters 120i, wherein i=a, b, . . . , g, in order to ensure synchronization and compensate the clock drift resulting from the distributed consensus-based synchronization performed for its own cluster 100a. The correction information corresponds to the correction value determined as already described hereinbefore with regard to FIG. 5. The correction information is derived from the difference between the clock timing resulting from the distributed consensus-based synchronization for its own cluster 100a and the adjusted reference clock timing.

In other words, the concentrator device 110a obtains the correction information to be used by the smart meters 120i, wherein i=a, b, . . . , g, in order to ensure synchronization and compensate the clock drift resulting from the distributed consensus-based synchronization performed for its own cluster 100a, from synchronization signals resulting from the distributed consensus-based synchronization performed for its own cluster 100a, and from the distributed consensus-based synchronization performed for another cluster 100a, 100b.

In a following step S1306, the concentrator device 110a transmits the correction information throughout its cluster, and therefore throughout the communications network 200. In other words, in view of the communications network 200 shown in FIG. 2, the correction information is relayed by the smart meters from the cluster 100a toward the clusters 100b, 100c.

Thanks to the performing of the algorithms of FIGS. 12 and 13, the concentrator devices 110a, 110b, 110b, despite they don't share a common external reference clock timing, can converge toward a same reference clock timing. Indeed, as the smart meters participate in the distributed consensus-based synchronizations of each cluster 100a, 100b, 100c, whatever is the cluster to which they respectively belong, the concentrator devices 110a, 110b, 110c can observe the course of said distributed consensus-based synchronizations and therefore obtain an information related to the reference clock timing used by the other concentrator devices. The concentrator devices 110a, 110b, 110c can then adjust their reference clock on the basis of these observations and find a consensus toward a same reference clock timing, thus improving the overall performance of the communications network 200.

The invention claimed is:
1. A method for performing synchronization and compensating clock drift among a plurality of communication devices interconnected to form a mesh communications network,
wherein all said communication devices, except one given communication device, perform a first distributed consensus-based synchronization;
and wherein said given communication device performs:
obtaining a first correction information derived at least from a difference between a clock timing resulting from the first distributed consensus-based synchronization and a reference clock timing; and transmitting the first correction information through the mesh communications network;

and wherein all said communication devices, except said given communication device, further perform:

updating the clock timing resulting from the first distributed consensus-based synchronization by taking into account the transmitted first correction information.

2. The method according to claim 1, wherein said given communication device obtains the first correction information from at least one clock timing derived from synchronization signals received from at least one respective communication device when performing the first distributed consensus-based synchronization.

3. The method according to claim 1, wherein said given communication device obtains the first correction information from a server device and said given communication device performs:

obtaining a local correction information from one clock timing derived from synchronization signals received from at least one respective communication device when performing the distributed consensus-based synchronization; and transmitting the local correction information to the server device;

and wherein, the server device being connected to multiple groups of communication devices interconnected to form respective mesh communications networks, said server device performs:

receiving a local correction information from one communication device of each said group;

combining the received local correction information to obtain said first correction information.

4. The method according to claim 1, wherein, said given communication device being interconnected with at least one group of communication devices interconnected to form at least one other respective mesh communications networks, said given communication device performs:

obtaining a local correction information from one clock timing derived from synchronization signals received from at least one respective communication device when performing the first distributed consensus-based synchronization and a reference clock;

transmitting the local correction information to one communication device of each of another group;

receiving another local correction information from said communication device of each said another group; and combining the received local correction information to obtain said first correction information.

5. The method according to claim 1, wherein, said given communication device being interconnected with plural groups of communication devices interconnected to form plural respective other mesh communications networks, a set of communication devices performs a second distributed consensus-based synchronization, said set being formed by one communication device for each said other mesh communications network;

and said given communication device performs:

obtaining a second correction information derived at least from a difference between a clock timing resulting from the second distributed consensus-based synchronization and the reference clock timing; and transmitting the second correction information to said set of communication devices;

and said set of communication devices further performs:

updating the clock timing resulting from the second distributed consensus-based synchronization by taking into account the transmitted second correction information.

6. The method according to claim 1, wherein said given communication device obtains the first correction information from at least one clock timing derived from synchronization signals received from at least one respective communication device when performing the first distributed consensus-based synchronization and from at least one other clock timing derived from other synchronization signals received from said at least one respective communication device when performing another distributed consensus-based synchronization.

7. The method according to claim 6, wherein said given communication device adjusts the reference clock timing from the at least one clock timing derived from synchronization signals received from said at least one respective communication device when performing the first distributed consensus-based synchronization and from the at least one other clock timing derived from other synchronization signals received from said at least one respective communication device when performing said another distributed consensus-based synchronization.

8. A system for performing synchronization and compensating clock drift among a plurality of communication devices interconnected to form a mesh communications network, wherein all said communication devices, except one given communication device, comprise means for performing a first distributed consensus-based synchronization;

and wherein said given communication device comprises:

means for obtaining a first correction information derived at least from a difference between a clock timing resulting from the first distributed consensus-based synchronization and a reference clock timing;

means for transmitting the first correction information through the mesh communications network;

and wherein all said communication devices, except said given communication device, further comprise:

means for updating the clock timing resulting from the first distributed consensus-based synchronization by taking into account the transmitted first correction information.

9. A method for performing synchronization and compensating clock drift among a plurality of communication devices interconnected to form a mesh communications network, wherein a given communication device performs:

obtaining a first correction information derived at least from a difference between a clock timing resulting from a first distributed consensus-based synchronization and a reference clock timing, the first distributed consensus-based synchronization being performed by all said communication devices, except said given communication device; and transmitting the first correction information through the mesh communications network, the transmitted first correction information aiming all said communication devices, except said given communication device, at updating the clock timing resulting from the first distributed consensus-based synchronization.

10. A communication device for performing synchronization and compensating clock drift among a plurality of communication devices interconnected to form a mesh communications network, wherein said communication device comprises:
- means for obtaining a first correction information derived at least from a difference between a clock timing resulting from a first distributed consensus-based synchronization and a reference clock timing, the first distributed consensus-based synchronization being performed by all said communication devices, except the communication device;
- means for transmitting the first correction information through the mesh communications network, the transmitted first correction information aiming all said communication devices, except said given communication device, at updating the clock timing resulting from the first distributed consensus-based synchronization.

11. A method for performing synchronization and compensating clock drift, the method being performed by a server device connected to multiple groups of communication devices interconnected to form respective mesh communications networks, wherein said server device performs:
- receiving a local correction information from one communication device of each said group, said local correction information being obtained from one clock timing derived from synchronization signals received from at least one respective communication device when performing a first distributed consensus-based synchronization and a reference clock;
- combining the received local correction information to obtain a first correction information; and
- transmitting the first correction information to said one communication device of each said group.

12. A server device for performing synchronization and compensating clock drift, the server device aiming at being connected to multiple groups of communication devices interconnected to form respective mesh communications networks, wherein said server device comprises:
- means for receiving a local correction information from one communication device of each said group, said local correction information being obtained from one clock timing derived from synchronization signals received from at least one respective communication device when performing a first distributed consensus-based synchronization and a reference clock;
- means for combining the received local correction information to obtain a first correction information;
- means for transmitting the first correction information to said one communication device of each said group, the transmitted first correction information aiming said one communication device of each said group at allowing updating the clock timing resulting from the first distributed consensus-based synchronization.

13. A method for performing synchronization and compensating clock drift among a plurality of communication devices interconnected in groups to form a mesh communications network, wherein a considered communication device performs, in collaboration with all said communication devices except one given communication device, a first distributed consensus-based synchronization;
- receiving a first correction information from said given communication device, said first correction information being derived at least from a difference between a clock timing resulting from a first distributed consensus-based synchronization and a reference clock timing; and
- updating the clock timing resulting from the first distributed consensus-based synchronization by taking into account the received first correction information, a transmitted first correction information aiming said considered communication device of each group at allowing updating the clock timing resulting from the first distributed consensus-based synchronization.

14. A communication device for performing synchronization and compensating clock drift among a plurality of communication devices interconnected to form a mesh communications network, wherein the communication device comprises:
- means for performing, in collaboration with all said communication devices except one given communication device, a first distributed consensus-based synchronization;
- means for receiving a first correction information from said given communication device, said first correction information being derived at least from a difference between a clock timing resulting from the first distributed consensus-based synchronization and a reference clock timing;
- means for updating the clock timing resulting from the first distributed consensus-based synchronization by taking into account the received first correction information.

* * * * *